United States Patent [19]

Franks

[11] Patent Number: 5,513,580
[45] Date of Patent: May 7, 1996

[54] LOCKBOX FOR INSTALLATION IN CLOSETS

[76] Inventor: Curtis Franks, 18 Archview Dr., Belleville, Ill. 62221

[21] Appl. No.: 204,491

[22] Filed: Feb. 28, 1994

[51] Int. Cl.⁶ .................................................... E05G 1/04
[52] U.S. Cl. ............................... 109/51; 220/8; 109/59 R
[58] Field of Search ...................................... 220/578, 4.28, 220/4.33, 629, 8; 109/59 R, 61, 51, 50, 52

[56] References Cited

U.S. PATENT DOCUMENTS

| | | | |
|---|---|---|---|
| 1,098,132 | 5/1914 | Spitz | 292/DIG. 42 |
| 1,120,955 | 12/1914 | Martin | 220/8 |
| 1,941,375 | 12/1933 | Wildman | 220/8 |
| 2,369,728 | 2/1945 | Farkas | 220/8 |
| 4,249,684 | 2/1981 | Miller et al. | 248/551 |
| 4,724,976 | 2/1988 | Lee | 220/8 |
| 4,926,762 | 5/1990 | Paul | 70/422 |
| 5,031,548 | 7/1991 | Huguenin | 109/45 |
| 5,299,721 | 4/1994 | Cummings | 70/58 |

*Primary Examiner*—Darnell M. Boucher
*Attorney, Agent, or Firm*—Patrick D. Kelly

[57] ABSTRACT

This invention discloses a lockbox or safe for storing possessions, which can be installed in a closet in a manner that requires opening the lockbox before it can be removed from the closet. This is done by providing one or more extensions (such as side walls, rigid shafts, or end caps) that can be extended outwardly from either or both sides of the lockbox. When retracted, the lockbox has dimensions that allow it to be inserted into the closet through the closet door. After it is positioned on the floor of the closet, the compartment door is opened. This provides access to a mechanism that controls the positioning of the extensions, such as bolts or cotter pins that interact with multiple spaced holes in sliding mechanisms. The extension locking mechanism is unlocked, and the extensions are pushed outwardly until they press against the side walls of the closet. As long as the lockbox remains locked, the extensions pressing against the side walls of the closet will prevent the lockbox from being removed from the closet, unless the door jamb and/or closet walls are destroyed. Since such destruction is beyond the capability and desire of most thieves, the lockbox and its valuables will be secure against most attempted break-ins. For homes or apartments, these lockboxes can also be screwed or bolted to the floor or wall of a closet, using screws or bolts that can be removed only when the lockbox is open. These lockboxes can also be secured in a similar manner inside automobile trunks.

11 Claims, 2 Drawing Sheets

LOCKBOX FOR INSTALLATION IN CLOSETS

BACKGROUND OF THE INVENTION

This invention is in the field of security devices such as safes or lockboxes for holding valuable possessions. The lockboxes described below are intended for use in homes, apartments, hotel or motel rooms where guests stay, and similar locations where people reside, which require moderate levels of security for protection against thieves. These lockboxes are not intended for use in banks or other business establishments that require higher levels of security for protection against armed robberies.

As used herein, the term "lockbox" refers interchangeably to a lockbox, safe, or strongbox with an enclosed compartment designed for holding valuable possessions and with access provided by a door that can be locked or unlocked by an operator (presumably the owner) using a key, combination, or other unlocking device or information to actuate the lock which controls the door. The term "lockbox" implies portability, in the sense that a lockbox can be physically lifted and carried (when disengaged, if necessary, from any securing or attachment devices) by one or perhaps two adult men. It excludes car trunks and other automotive-type enclosures, and it excludes vaults that are permanently affixed in a non-movable manner, such as in a wall recess.

Various types of lockboxes have been created for locking away valuables (cash, credit cards, travellers' checks, car titles, stock certificates, jewelry, cameras, etc.) or potentially dangerous items, such as guns, hunting knives, fireworks, or liquor bottles in homes with children or teenagers. Some are heavy, so they cannot be carried away easily; others are camouflaged or hidden, while still others are bolted, welded, or otherwise securely affixed to structural members such as floor beams or walls.

The goal of such lockboxes is not to provide absolute security; instead, the goal is to withstand a break-in by a thief who is in a hurry and who wants to steal valuables as quickly as possible, without making excessive or suspicious noises, and then leave quietly.

The goal of moderate security to withstand common break-ins is illustrated by various items of prior art, including U.S. Pat. No. 4,228,746 (Caton 1980). This patent discloses a lockbox for use in hotel closets, in which the lockbox is positioned in a closet and secured to the closet floor using a stud. Such studs were not described or illustrated in the patent; presumably, the term "stud" as used in that patent refers to a threaded shaft (comparable to a steel bolt) which is permanently mounted in the floor, extending upwardly from the surface of the closet floor. The lockbox shown in the patent has a small round hole in the bottom panel. That hole is positioned over the stud as the lockbox is lowered onto the closet floor. A large flat washer is then presumably placed over the stud, and a threaded nut is screwed down tightly on top of the washer to hold the lockbox securely in place.

This arrangement appears to be feasible and potentially useful, but it has at least two important limitations. First, the lockbox must be already installed in the closet before a guest arrives; it is not portable, and it cannot be brought to a hotel by the guest and installed by the guest during his stay at the hotel. If a hotel does not provide such lockboxes in its closets, then the lockboxes will not be available for use by guests. In addition, this approach requires installation of a stud that is permanently affixed so that it rises up out of the floor of the closet. Depending on how a closet floor is designed, what is beneath it, and the materials of construction, this might pose a difficult and expensive obstacle to installation. There is also a potential risk of removal; if a stud is installed in a closet floor by drilling through the floor and penetrating the ceiling of the next lower level, so that a large bolt can be pushed up through the ceiling into the closet floor, this poses a risk that the bolt might be removed from below.

Also of interest as prior art are U.S. Pat. No. 4,030,426 (Lyons 1977) and U.S. Pat. No. 4,559,880 (Lacka 1985). Both of these patents relate to relatively small rectangular lockboxes that can be affixed inside a drawer of a cabinet, dresser, desk, or similar piece of furniture. However, both such devices suffer from a weakness: a drawer that holds such a lockbox can be removed fairly quickly from the cabinet, dresser, or desk that holds the drawer; if the drawer is restrained within the furniture by, for example, a small piece of wood, it is not difficult for a thief to pry the drawer out using a small tool. Both the drawer and the lockbox can then be carried away by the thief. For example, if a hotel is being "worked" by a thief who knows the hotel provides small lockboxes in room drawers for guests, the thief can show up with a suitcase large enough to hold an entire drawer enclosing a lockbox. Pretending to be a guest, he can sneak or break into the room of a guest who is out, quickly pry the drawer out of the cabinet or dresser that holds it, put it in the suitcase, and then walk out of the room and leave the hotel or motel calmly. The suitcase can even be on wheels, to handle the extra weight of the lockbox.

Accordingly, one object of this invention is to provide a home or hotel-type safe or lockbox which is large enough to hold valuables, guns, or other possessions, which cannot be stolen by a thief without requiring excessive time and noise.

Another object of this invention is to provide a portable closet lockbox that can be installed quickly and easily by a guest in the closet of a hotel or motel, without requiring any tools or any holes to be drilled in a closet wall or floor. This type of portable lockbox can be transported in automobile trunks by travelling businessmen, vacationing families, etc. The owner can quickly and easily install the lockbox in a hotel closet when checking in, and remove the lockbox and carry it away when checking out.

Yet another object of this invention is to provide a relatively long lockbox capable of holding rifles, that is hidden from sight and unobtrusive. In view of the antagonism often generated by debates and arguments over gun control, many rifle owners feel uncomfortable having a rifle case standing out in open sight, where any guest (or thief) will immediately see it upon entering the room. Even when rifle cases are securely locked inside a bracket that is firmly bolted to the wall to resist break-ins, the owner might prefer to keep the entire case out of sight, and conveniently out of the way of ordinary traffic in the room.

These and other objects and benefits can all be accomplished by the lockbox invention described below.

SUMMARY OF THE INVENTION

This invention discloses a lockbox or safe for storing possessions, which can be installed in a closet in a manner that requires opening the lockbox before it can be removed from the closet. This is done by providing at least one and possibly two extensions (such as side walls, arms, or end caps) that can be extended outwardly from at least one and possibly two or more sides of the lockbox. When the extension(s) are retracted, the lockbox has dimensions that allow it to be inserted into the closet through the closet door. After it is positioned on the floor of the closet, the compartment door is opened, providing access to a mechanism that controls the positioning of the extensions, such as bolts or cotter pins that interact with multiple spaced holes in two sliding mechanisms on opposed sides of the lockbox. The extension locking mechanism is unlocked, and the extensions are pushed outwardly until they press against at least two opposed walls of the closet. The extensions are secured in the extended position, valuables or other possessions are placed in the lockbox, and the compartment door is closed and locked. As long as the lockbox remains locked, the extensions pressing against the walls of the closet will prevent the lockbox from being removed from the closet, unless the door jamb and/or closet walls are destroyed. Since such destruction is beyond the capability and desire of most thieves, the lockbox and its valuables will be secure against most attempted break-ins. Such lockboxes can be transported in automobiles by businessmen, people on vacation, etc., and installed quickly and easily in hotel or motel closets. For homes or apartments, these lockboxes can also be screwed or bolted to the floor or wall of a closet, using screws or bolts that can be removed only when the lockbox is open. These lockboxes can also be secured in a similar manner inside automobile trunks.

DESCRIPTION OF THE PREFERRED EMBODIMENTS

Figure 1:
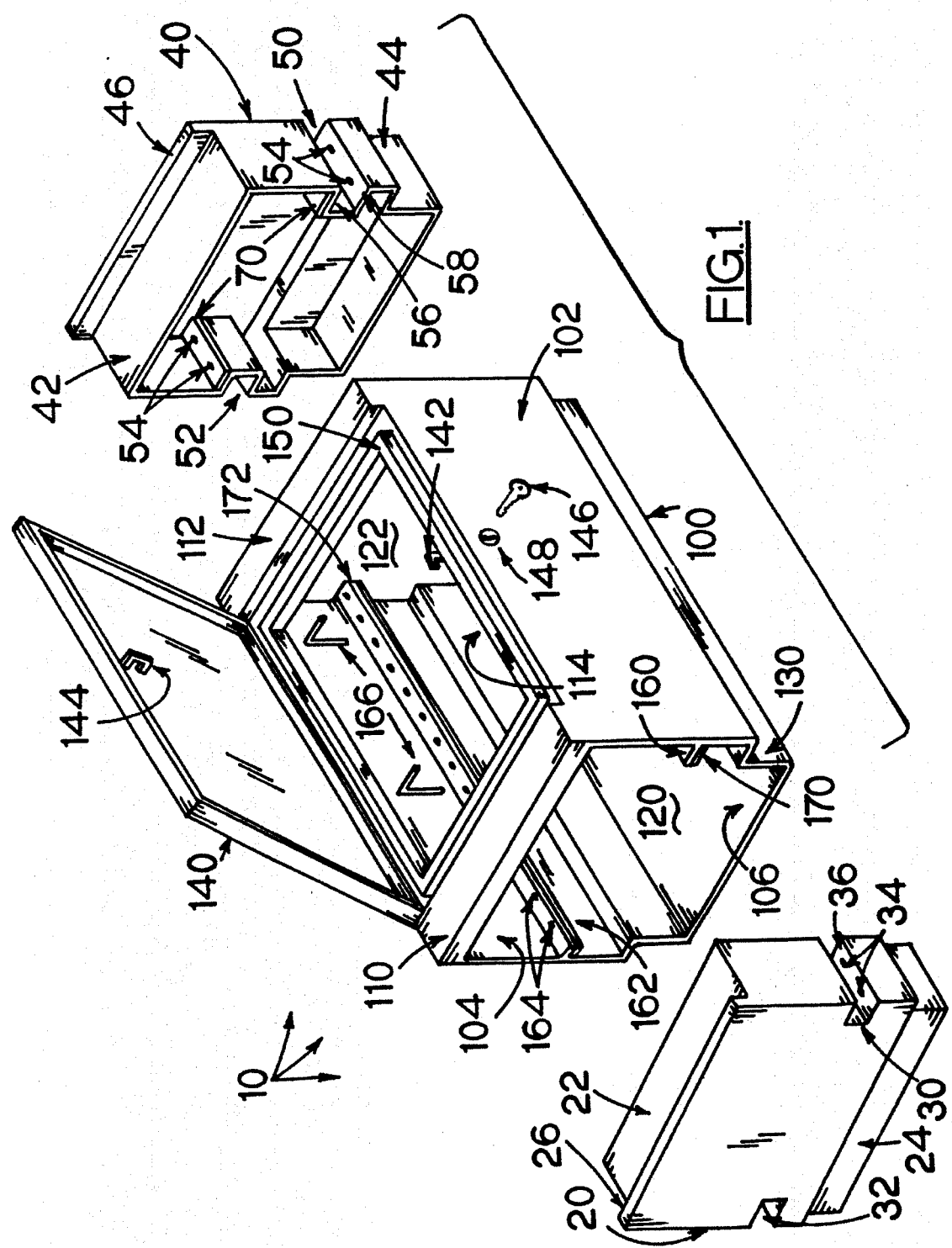
FIG. 1 is a cutaway view of a closet lockbox of this invention, showing movable side walls on both sides of the lockbox.

Referring to the drawings by reference number, FIG. 1 depicts a lockbox 10 with movable right and left side walls 20 and 40, which interact with center shell assembly 100, which comprises a front wall 102, a back wall 104, a bottom floor 106, and two top surfaces 110 and 112 which flank top door opening 114.

An extended rim 22 on left side wall 20 slides into an accommodatingly shaped open entryway 120 in the left side of center shell 100, while rim 42 on right side wall 40 similarly slides into an open entryway 122 on the right side of center shell 100. The rims 22 and 42 are somewhat truncated in the figures, for purposes of illustration; if rims are provided that extend nearly to the center of center shell 100 when the lockbox assembly is in the fully retracted position, they can provide additional width when the lockbox is extended.

Preferably, right and left side walls 20 and 40 should be symmetric about a vertical plane, and identically sized and shaped. This would allow a single mold or metal-bending jig to be used for making both side walls, which will reduce manufacturing costs. Alternately, the outer shell component can be provided with an open entryway at one side end and a closed wall at the opposed side end, with a single side wall component that would slide into the open end of the outer shell. This would provide a compartment enclosed by two, rather than three, slidably engaged components.

In the design shown in FIG. 1, the side walls 20 and 40 are provided with indentations 24 and 44 around the bottom, and the center shell 100 is provided with a similar indentation 130, to allow the lockbox to rest securely on a closet floor and press solidly against the closet walls even if molding or other trim (shown as item 240 in FIG. 2) has been installed around the closet floorboard, next to the closet walls.

In addition, each of side walls 20 and 40 is provided with a top ridge 26 or 46 which will not fit inside the center shell 100. These ridges 26 and 46 can increase the strength of the side walls, and it ensures that the side walls cannot become jammed in the center shell if pressed hard during closure, or during shipping or storage before sale to a buyer.

The center shell 100 is also provided with a hinged lid or compartment door 140 and locking devices 142 and 144 controlled by key 146 which fits into keyhole 148 (a circular key, a combination lock, or any other suitable locking system could be used instead of a conventional flat key as shown). The door locking devices allow the owner or any other lawful operator to lock door 140 in the closed position. A raised rim 150 can be provided around the periphery of door opening 114, or around the periphery of door 140, to eliminate any sideways motion of the door 140 when it is closed, and to prevent a thief from trying to insert an unlocking tool into the gap between the door 140 and the top of the center shell 100.

In the design shown in FIG. 1, two opposed slots 30 and 32 are provided in opposing sides (front and back) of left side wall 20, and two similar slots 50 and 52 are provided in right side wall 40. Front slot 30 accommodates a front rail 160 inside center shell 100, while rear slot 32 accommodates rear rail 162. The front and rear rails 160 and 162 are provided with spaced vertical holes 164 having suitable diameters, such as about 5 mm (about ¼ inch) or more, along their length. The front and rear slots in side walls 20 and 40 are also provided with accommodating vertical locking holes 34 and 54 which pass through horizontal slot walls 36 (left side wall 20) and 56 and 58 (right side wall 40).

Sufficient clearance is provided above front and back rails 160 and 162 to insert locking pins 166 through the vertically aligned holes of slots 30 and 50 and front rail 160, and through aligned holes of slots 32 and 52 and rear rail 162, after the side walls 20 and 40 have been fully extended to press against the side walls of a closet during installation. If two extendable side walls are used (one on each side of the center shell), at least four locking pins will be used; a front pin and a back pin will be provided for each side wall. If desired, additional pins can also be used. Any suitable type of locking pin can be used, such as a cotter pin, a bolt (which can be fully or partially threaded to allow a nut to be screwed onto the bottom, for additional security against tampering), a pin having a bent portion (as shown) or a round eye for better gripping, etc.

Other types of extension locking devices can also be used if desired, such as spring-loaded ratcheting devices that interact with spaced gears or notches. However, these are usually more expensive than simple systems using locking pins and spaced holes.

If desired, the locking holes 34 and 54 in side walls 20 and 40 can be spaced in a manner that provides additional lockable gradations when the side walls are being extended. For example, if the holes 56 in the rails of center shell 50 are spaced evenly apart, such as 10 mm or ½ inches, center to center, then the two holes 34 in side wall slot 30 can be spaced apart 15 mm or 0.75 inches. This will cause a complete set of front and back holes in the side wall slots to be fully aligned with a set of rail holes every 5 mm or 0.25 inches, as the side walls 20 and 40 are extended during installation. A third hole can be provided in each rail, staggered between the distances specified above (e.g., at 12.5 mm or ⅝ inches) to provide even more locking points, allowing the width to be locked every 2.5 mm or ⅛ inch. This approach will provide for a tighter and more secure fit when the lockbox 10 is installed in a closet.

Figure 2:
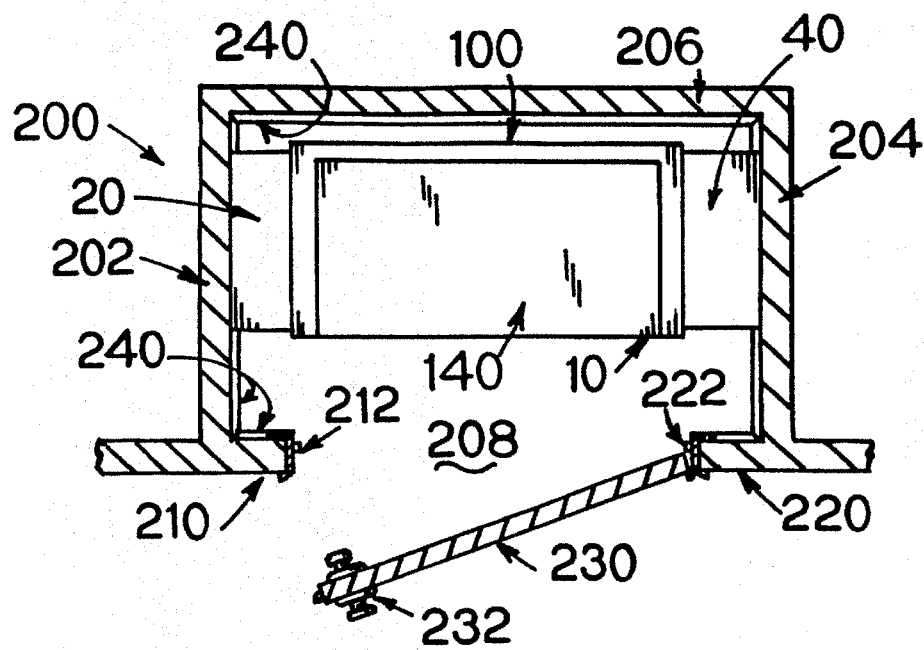
FIG. 2 is a top view of a closet lockbox installed in a closet, with its arms extended and locked to prevent removal of the lockbox from the closet.

FIG. 2 is a top view of lockbox 10 after it has been installed in a closet 200, which comprises two opposed side walls 202 and 204, a back wall 206, a doorway 208 flanked by two door jambs 210 and 220 with vertical molding and reinforcing strips 212 and 222, and a hinged door 230 with a conventional doorknob 232. Molding strips 240 have been installed around the interior closet walls 202–206 where the walls meet the floors.

In a conventionally designed closet, the side walls of a closet are usually about 15 cm (6") to about 50 cm (20") farther apart than the width of the doorway. This design maximizes closet space while allowing conventional door jambs with hinged doors to be used. While the door 140 of lockbox 10 was open, side walls 20 and 40 were extended outwardly from center shell 100 until they pressed against the side walls 202 and 204 of closet 200. After extension, the side walls 20 and 40 were locked in the extended position, using locking pins that are inaccessible inside the lockbox as long as the compartment door 140 remains closed.

The height and depth of the lockbox are not critical for providing the benefits described herein, and can be varied so long as the depth (i.e., the exterior dimension from the front wall to the back wall) allows the lockbox to be inserted into a conventionally designed closet. Most standard closets have depths in the range of about 23 to 32 inches; accordingly, lockboxes with depths in that range or slightly smaller would fit into at least one closet in most houses or apartments. A height in the range of about 36 to 50 cm (14 to 20 inches) is contemplated for a lockbox which rests like a relatively small cabinet on a closet floor; however, this dimension is entirely a matter of preference, and some people would prefer a relatively tall lockbox with a height of 100 cm (40 inches) or more with a front-opening door, for purposes such as storing rifles vertically in one part of the lockbox and with rows of adjustably mounted shelves or drawers along either or both of the side walls inside the lockbox for storing smaller items.

As long as lockbox 10 remains locked, it cannot be removed from closet 200 without ripping out at least one of door jambs 210 or 220 or at least one of the closet side walls 202 or 204. The lockbox 10 cannot be tipped up so that it stands on one end (which would allow removal through the doorway 208) unless one of the side walls 202 or 204 in the closet is broken and torn out. The height of the lockbox, which should be at least 30 cm (12"), and preferably 45 cm (18") or more, and the snug fit of the lockbox side walls 20 and 40 against closet walls 202 and 204, will prevent a thief from lifting either end of the lockbox and standing the lockbox on side wall 20 or 40 to remove it from closet 200.

In its retracted position (when the side walls 20 and 40 are pushed the maximum distance into the center shell 100), lockbox 10 can have an overall width that allows it to be inserted through a typical 60 cm (24 inch) or larger closet door without tilting or turning. If the overall width of the lockbox in the retracted position is about 58 cm (23 inches) or less, the lockbox will enter the large majority of typical closet doors without requiring tilting; a smaller closet door can also be entered if the lockbox is momentarily tilted during passage through the door.

If end ridges 26 and 46 are provided on side walls 20 and 40, as described above, and if the side wall rims 22 and 42 extend half the length of the center shell 100, so that their tips can touch in the middle of center shell 100 when the lockbox is fully retracted, then lockbox 10 will be extendable to a maximum width of almost twice the retracted width. For example, a lockbox with a retracted width of 23" and end ridges ½" wide can be extended up to about 40" wide while still providing 2.5" at each end for the slots in each side wall to overlap and be locked with the rails in the center shell. Since most homes and apartments (and many hotels and motels) have at least one closet with an interior width less than 40", a lockbox as described herein having a retracted width of about 23" would accommodate the large majority of homes and apartments and many hotels and motels.

Alternately, a larger lockbox with a retracted width up to about 36" (or even longer) could be easily installed in the large majority of home closets, so long as the height of the lockbox is 23" or less, simply by tilting it up on one end as it passes through the closet door, then laying it down on the floor after it is inside the closet. A lockbox of this size could be extended to provide an enclosed compartment more than 60" long if the side wall rims are sufficiently long; this size lockbox would be especially useful for accommodating rifles.

As another alternative, the closet lockboxes described herein can be manufactured and sold in several sizes, to accommodate an even broader range of closet sizes.

In claim terminology, the lockbox described above comprises an enclosed compartment for holding valuable items, comprising at least two enclosure members (such as an outer shell with an entryway, and at least one slidable side wall with a rim that fits into the entryway) which are coupled to each other by means of slidable and lockable fittings which govern the width of the enclosure shell in a manner which allows extension and retraction of said components in a slidable manner to provide the enclosure shell with an adjustable and lockable exterior width. The enclosure shell is also provided with a lockable door that provides operator-controlled access into the compartment, wherein the slidably-engaged and lockable fittings are positioned inside the compartment in a manner that allows them to be adjusted and locked or unlocked only by an operator having access into the compartment through the compartment door. This allows the operator to:

(1) retract the enclosure shell to a retracted width which allows the lockbox to be inserted into a closet through the doorway;

(2) extend the enclosure shell to an extended width that causes the enclosure shell to press against the side walls of the closet;

(3) lock the slidable fittings, thereby securing the enclosure shell in the extended width;

(4) close and lock the lockable compartment door. This renders it impossible to remove the lockbox from the closet without structurally damaging the closet, until the compartment door is opened to provide access to the slidable fittings.

Use in Automobile Trunks

The lockboxes described herein can also be secured inside the trunks of many automobiles, including sedans and other cars that have conventional trunks (as distinct from hatchbacks, vans and minivans, station wagons, etc). Installation is done in a manner comparable to closet installation (i.e., by retracting them for insertion into a trunk through a trunk lid, extending them as far as possible after they're resting in the trunk compartment, and locking them in the extended position so they can't be removed from the trunk). It should be noted that lockboxes secured inside automobile trunks in this manner do not require snug or even close fits; so long as a lockbox in an extended position is too large or unwieldy to be wrestled out of the trunk, through the trunk lid, then it will be effective.

As crime, illegal drug use, and joy-riding car thefts all increase, people and companies are growing more concerned about automobile security. A typical lock on a car trunk can be picked, popped, or cut out within a few minutes by an experienced car thief. Accordingly, many people (especially businessmen who travel in their cars, and urban dwellers with expensive stereo equipment in their cars) would like to have a lockbox which provides a much stronger, more tamper-resistant enclosure than just a trunk that can be broken into easily; such lockboxes can be provided with hardened steel shells and with locks that requires circular keys, which are extremely difficult or impossible to pick. For example, someone who parks in an urban area and needs to move valuables from the passenger compartment to the trunk would discourage any would-be thieves who see him putting the valuables into his trunk, if the thieves see him lock the valuables inside an additional lockbox in the trunk. If desired, cars that have such lockboxes in their trunks can use rear window decals, rear bumper stickers, or other appurtenances to ward off potential thieves by letting them know that a lockbox-equipped car will pose much more difficulty than other, easier targets. If desired, this approach could be coupled with a program to install tamper-proof locks requiring circular keys on the trunks of automobiles that provide a higher level of security against trunk theft compared to average cars.

Accordingly, a lockbox for additional use in an automobile trunk as described herein should have, in addition to a variable width in the range described above, a depth and height that are small enough to allow the enclosure shell to be inserted into a conventional automobile trunk. For example, the height generally should be in the range of about 30 to 60 cm (about 12 to 24 inches) and a depth (i.e., from front to back) of about 30 to 75 cm (12 to 26 inches), for a compact to mid-sized car. Although it might be larger and still fit in some car trunks, most people would not want to occupy the entire trunk space with the lockbox, and would prefer to leave a substantial amount of trunk space open for less valuable items.

Extendable Arm Design

Figure 3:
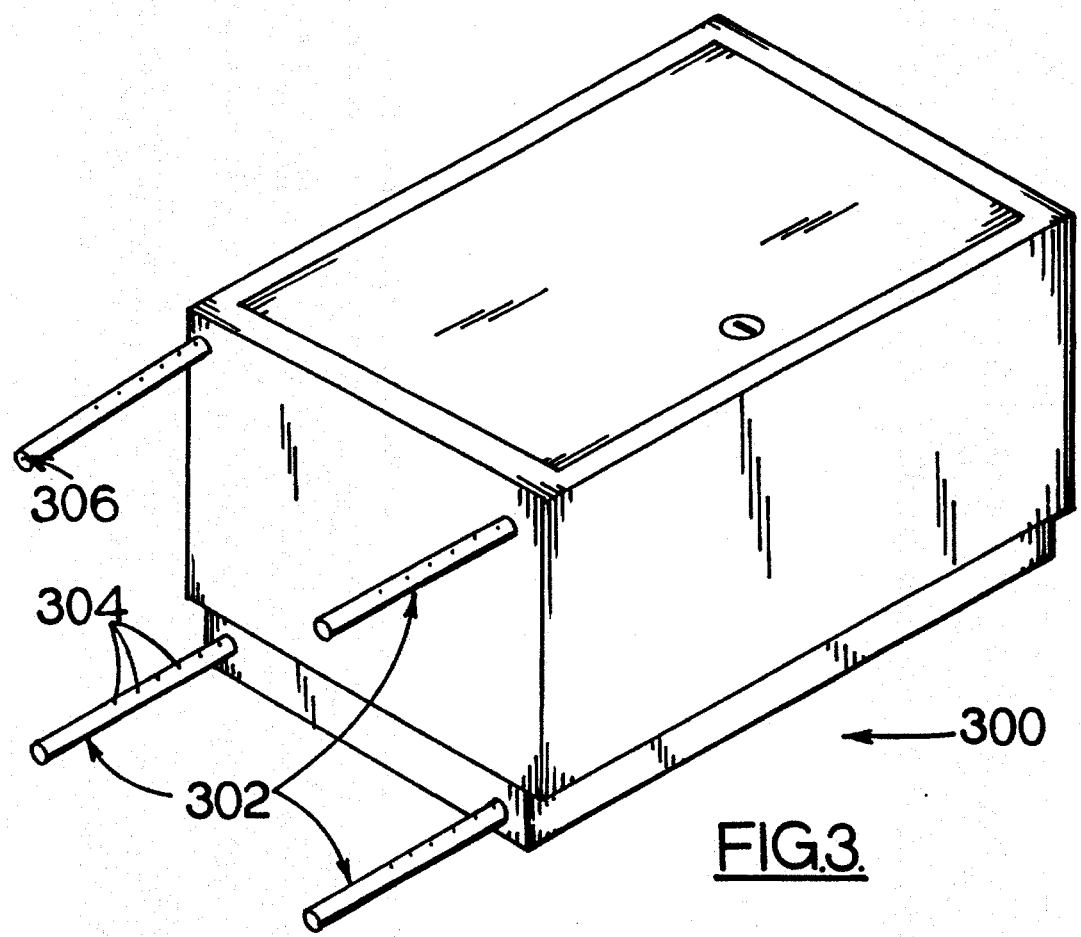
FIG. 3 depicts a closet lockbox of this invention having a single extendable arm.

FIG. 3 shows an alternate preferred embodiment, in which extension from a single side of a lockbox is used to secure the lockbox inside a closet. In this configuration, closet lockbox 300 is provided with a plurality of extendable arms 302, made of a material such as hardened steel which cannot be cut or sawed except with great difficulty. The arms can slide (for extension or retraction) in tracks, slots, or other accommodating structures (not shown) inside lockbox 300. The arms are equipped with multiple holes 304 spaced along their lengths, and their tips 306 can be provided with ridged, knurled, or other uneven surfaces to prevent sliding, or with enlarged foot-type devices to reduce the risk that a thief will try to pry up the lockbox in a manner that will cause the extended arms to dig grooves in the closet wall.

During installation, arms 302 are extended the maximum possible distance inside a closet, and pressed hard or tapped with a hammer to embed their tips in the wood, dry wall, or other material of the closet wall. The arms are then locked in the extended position, using locking pins inside lockbox 300 which pass through selected holes 304 in the arms 302 and through accommodating aligned holes in the tracks that hold the arms inside the lockbox.

This configuration, with extendable arms, suffers from the drawback that the storage compartment inside the lockbox is not as large as in the configuration shown in FIG. 1. However, this design may be preferred in some situations. For example, since the extendable arms (which would need to be moderately heavy, if made of steel) could be detached and carried separately without having to open the enclosure, and since this approach could eliminate some of the material from the enclosure components, a lockbox with this design could be made out of heavier and stronger material without rendering it too heavy to carry between a car and a hotel room.

If desired, extendable arms as shown in FIG. 3 can be provided in addition to extendable side walls as shown in FIGS. 1 and 2. Lockboxes having both extension mechanisms would be more expensive, but they would have two potentially valuable aspects which would justify the additional expense for many purchasers: (1) they could be used to provide lockboxes that would fit securely into a wider range of closets, and (2) they would allow the lockboxes disclosed herein to be secured inside the trunks of a wider range of automobiles.

Additional Features and Uses

The lockboxes described herein can be made out of steel or other sufficiently hard metal if desired; alternately, some of the components can be made out of hard molded plastics or fiberglass having sufficient thickness (preferably 5 mm or ⅜" or more).

If made of molded components, some of the molded components can be reinforced by steel strips. For example, flat pieces of hardened steel 170 and 172, which preferably should be at least 3 mm or ⅛" thick, can be embedded in or affixed on top of front rail 160 and rear rail 162 of the lockbox center shell 100, as shown in FIG. 1, and steel pieces 70 can be provided to reinforce the slots in side walls 20 and 40. The locking pins will pass through these steel pieces. In addition, selected components (such as door 140) can be made of either hardened steel or molded plastic that is thicker than the wall pieces.

The lockboxes described herein are relatively lightweight and well-suited for quick and easy installation. This renders them useful for people such as businessmen travelling in automobiles, and people on vacation, since these lockboxes can be carried about by an owner in the trunk or back seat of a car, and installed in a hotel or motel room during or shortly after check-in, without requiring any studs or other attachment devices to be previously installed in the closet, and without requiring the drilling of any holes in the floor or walls of a closet. When it is time to check out of the hotel, the owner simply opens the lockbox, retracts the extensions, lifts it out of the closet, and carries it to the car again.

Alternately, if a closet lockbox is being installed in a home or apartment, the owner can use large-thread screws to screw a lockbox to the floor of a closet, to provide an additional safeguard against removal. Instead of requiring a heavy attachment stud as required by U.S. Pat. No. 4,228, 746 (described above), it would be a simple task to drive a heavy screw (such as a hex-headed screw, which is driven with a wrench or socket rather than a screwdriver) through a small hole in the bottom of a closet lockbox, into a pilot hole that has been drilled into a wooden closet floor.

Alternately, if a closet floor is made of concrete or similar material, it is still a fairly simple task to drill two or more ½" holes in the concrete (using a drill bit made for concrete), insert anchors (made of soft metal such as lead) into the holes, position the lockbox over the holes, and drive heavy screws through the bottom wall of the lockbox and into the anchors. As the screws are screwed into the anchors, they force the anchors to expand tightly into the holes, providing a very strong and secure attachment.

The configuration described above, which provides a top-mounted door for access by the operator, is generally preferred for lockboxes designed to rest on the floors of closets. Since the lockboxes described herein need to be made of materials strong enough to withstand attempted break-ins, and since they will be designed to accommodate valuables or guns that may be heavy, installation on closet floors rather than shelves is preferable. If a top-mounted lid is provided, the owner can lean over or kneel down in front over the lockbox and see everything in it.

However, it is also possible to install closet lockboxes described herein, using front-mounted doors. A front-door lockbox can be installed on a sturdy shelf in a closet, and this configuration also allows for installation of multiple lockboxes, stacked on top of each other in a closet. Some houses and many apartment complexes, low-income housing complexes, hotels, motels, or other locations may wish to provide entire closets filled with multiple lockboxes for use by tenants, in locations that are guarded, video-monitored, or otherwise secure. By providing guests or tenants with secure closet lockboxes for storing valuables, an apartment complex, low-income housing complex, or hotel or motel can reduce the temptation for thieves, drug addicts, and others to try to break into rooms or apartments belonging to tenants or guests.

Thus, there has been shown and described a new and useful type of lockbox for installation in closets in homes, apartments, low-income housing complexes, hotels, motels, and similar locations where moderate levels of security are desired against break-ins, and for ensuring that guns and other dangerous items cannot be obtained by children.

Although the lockboxes described herein have been exemplified for purposes of illustration and description by reference to certain specific embodiments, it will be apparent to those skilled in the art that various modifications and alterations of the illustrated examples are possible. Any such minor variations which derive directly from the teachings herein and which do not depart from the spirit and scope of this invention are deemed to be covered by the claims that follow.

I claim:

1. A lockbox for storing possessions, comprising an enclosure shell which contains an enclosed compartment for holding valuable items, comprising at least two enclosure members which are coupled to each by means of slidably-engaged and lockable fittings which govern the width of the enclosure shell in a manner which allows extension and retraction of said components in a slidable manner to provide the enclosure shell with an adjustable and lockable exterior width, and wherein the enclosure members act together to provide (a) at least two opposed end surfaces which determine the width of the lockbox, (b) a bottom member suited for resting securely on a closet floor, (c) a front wall, (d) a back wall, and (e) a top member, and lockable compartment door that provides operator-controlled access into the enclosed compartment, wherein the slidably-engaged and lockable fittings are positioned in the enclosed compartment in a manner that allows them to be adjusted, locked, and unlocked only by an operator having access into the enclosed compartment through the compartment door, thereby allowing the operator to:

(1) retract the enclosure shell to a first retracted width which allows the lockbox to be inserted, through a closet doorway having a fixed width flanked by a door jamb on each side of the closet doorway, into a closet interior having opposed side walls spaced apart from each other a greater distance than the width of the closet doorway;

(2) extend the enclosured shell to a second extended width that causes the enclosure shell to press against the opposed side walls of the closet;

(3) lock the slidably-engaged and lockable fittings on the enclosure members to each other, thereby securing the enclosure shell in the extended width; and (4) close and lock the lockable compartment door, thereby rendering it impossible to remove the lockable in its extended width from the closet without structurally damaging the closet, until the lockable compartment door is opened to provide access to the locakable fittings on the enclosure members which govern the width of the enclosure shell;

wherein the two opposed end surfaces which determine the width of the lockbox are also provided with external indentations adjacent to the bottom member, thereby allowing both opposed end surfaces of the lockbox to press solidly against the two opposed side walls in the closet, when the lockbox is extended and resting securely upon a floor surface in the closet, even if floor molding has been installed on the two opposed side walls of the closet adjacent to the floor surface.

2. The lockbox of claim 1 wherein the enclosure members comprise an outer shell having at least one entryway and at least one side wall member having an extended rim accommodatingly sized to slide securely in the entryway.

3. The lockbox of claim 2 wherein the slidably-engaged and lockable fittings which govern the width of the enclosure shell comprise at least one rail mounted within the outer shell and at least one accommodatingly sized and positioned slot in the side wall member.

4. The lockbox of claim 2 wherein the slidably-engaged and lockable fittings which govern the width of the enclosure shell are locked in position by means of locking pins inside the enclosed compartment, inserted into alignable holes in the slidably-engaged and lockable fittings.

5. The lockbox of claim 2 wherein the enclosed compartment has an interior width of at least about 100 cm (39 inches) when the enclosure shell is fully extended.

6. The lockbox of claim 2 wherein the enclosure shell is sufficiently lightweight to be lifted and carried by an unassisted adult.

7. A lockbox for storing possessions, wherein the lockbox has dimensions suitable for installation in a closet having a closet door, a door jamb, and side walls which are spaced further apart than the width of the closet door, comprising an enclosure shell which encloses a storage compartment with a lockable door that governs access into the compartment, wherein the compartment encloses (a) at least one track for holding a slidable width extension member, and (b) a locking mechanism for a width extension member, and wherein the enclosure shell has a fixed width in the range of about 50 cm (20 inches) to about 85 cm (34 inches), and also comprising at least one width extension member, a portion of which emerges from an orifice in the enclosure shell and which is mounted, in a slidable and lockable manner, in the track enclosed within the compartment, wherein the locking mechanism for the width extension member can be reversibly locked and unlocked only by an operator having access into the storage compartment through the lockable door, thereby allowing the operator to:

(1) retract or remove the width extension member;

(2) insert the lockbox into a closet having opposed side walls spaced apart from each other a fixed distance which is greater than the width of the enclosure shell, through a closet doorway having a door jamb on each side;

(3) lock the width extension member in an extended position that presses against one side wall of the closet while an opposed end of the enclosure shell presses against and opposed side wall; via access to the compartment through the compartment door;

(4) close and lock the door that governs access into the compartment, thereby rendering it impossible to remove the lockbox for the closet without structurally damaging the closet until the lockable door is opened to provide access to the locking mechanism for the width extension member.

8. The lockbox of claim 7, wherein the enclosure shell has two opposed rectangular side walls and wherein four slidable width extension members are provided, each one positioned proximate to a corner of a side wall of the enclosure shell and each one governed by an independent locking mechanism.

9. The lockbox of claim 7, wherein the slidably-engaged and lockable fittings which govern the width of the enclosure shell are locked in position by means of locking pins inside the enclosed compartment, inserted into alignable holes in the slidably-engaged and lockable fittings.

10. The lockbox of claim 7 wherein the enclosed compartment has an interior width of at least about 100 cm (39 inches) when the enclosure shell is fully extended.

11. A lockbox for storing possessions, comprising an enclosure shell which contains an enclosed compartment for holding valuable items, comprising at least two enclosure members which are coupled to each other by means of slidably-engaged and lockable fittings which govern the width of the enclosure shell in a manner which allows extension and retraction of said components in a slidable manner to provide the enclosure shell with an adjustable and lockable exterior width, and a lockable compartment door that provides operator-controlled access into the enclosed compartment, wherein the slidably-engaged and lockable fittings are positioned in the enclosed compartment in a manner that allows them to be adjusted, locked, and unlocked only by an operator having access into the enclosed compartment through the compartment door, thereby allowing the operator to:

(1) retract the enclosure shell to a first retracted width which allows the lockbox to be inserted, through a closet doorway having a fixed width flanked by a door jamb on each side of the closet doorway, into the closet interior having opposed side walls spaced apart from each other a greater distance than the width of the closet doorway;

(2) extend the enclosure shell to a second extended width that causes the enclosure shell to press against the opposed side walls of the closet;

(3) lock the slidably-engaged and lockable fittings on the enclosure members to each other, thereby securing the enclosure shell in the extended width; and (4) close and lock the lockable compartment door, thereby rendering it impossible to remove the lockbox in its extended width from the closet without structurally damaging the closet, until the lockable compartment door is opened to provide access to the lockable fittings on the enclosure members which govern the width of the enclosure shell;

wherein two opposed and adjustable end surfaces which determine the extended width of the enclosure shell when the lockbox is extended are further characterized by the absence of any end-mounted protrusions which would prevent extension of the enclosure shell to a width which causes two opposed external surfaces of the enclosure shell to press securely against the opposed side walls of the closet.

* * * * *